(12) United States Patent
Takeda et al.

(10) Patent No.: US 8,423,246 B2
(45) Date of Patent: Apr. 16, 2013

(54) IN-LANE RUNNING SUPPORT SYSTEM, AUTOMOBILE AND IN-LANE RUNNING SUPPORT METHOD

(75) Inventors: Yuya Takeda, Sagamihara (JP); Takeshi Kimura, Yokohama (JP); Taku Takahama, Yokohama (JP); Tomoyuki Kashiwaya, Ebina (JP); Yukinori Nishida, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 784 days.

(21) Appl. No.: 12/174,140

(22) Filed: Jul. 16, 2008

(65) Prior Publication Data

US 2009/0024279 A1   Jan. 22, 2009

(30) Foreign Application Priority Data

Jul. 19, 2007 (JP) .................................. 2007-188274
Jul. 19, 2007 (JP) .................................. 2007-188275
Mar. 24, 2008 (JP) .................................. 2008-76283

(51) Int. Cl.
*B62D 6/00* (2006.01)
*B62D 5/04* (2006.01)

(52) U.S. Cl.
USPC ........... 701/41; 180/443; 318/432; 340/407.1

(58) Field of Classification Search ............ 701/41; 180/446, 443; 318/432; 340/407.1; *B62D 6/00, B62D 5/04*
See application file for complete search history.

(56) References Cited

U.S. PATENT DOCUMENTS 5,742,141 A * 4/1998 Czekaj ........................ 318/587
5,762,160 A * 6/1998 Shimizu ....................... 180/446
5,765,116 A * 6/1998 Wilson-Jones et al. ......... 701/41
5,828,968 A * 10/1998 Iiboshi et al. .................. 701/23

(Continued)

FOREIGN PATENT DOCUMENTS

FR    2 849 409 A1    7/2004
JP    11-147481 A     6/1999

(Continued)

OTHER PUBLICATIONS

Japanese Office Action dated Feb. 14, 2012 for Japanese Patent Application No. 2008-076283.

*Primary Examiner* — Tuan C. To
(74) *Attorney, Agent, or Firm* — Foley & Lardner LLP

(57) ABSTRACT

The in-lane running support system includes a steering input device and a steering input detector. The in-lane running support system further comprises a reaction force device that changes a condition of the steering input device between a normal operation mode that provides a normal reaction force to the driver, and a hapthic operation mode that performs a notification operation to the driver, a turning output device that is in a state mechanically disconnected from the steering input device and that turns steerable wheels, and a turning output controller. A running state detecting device acquires information of a running state of the vehicle with respect to a lane. An in-lane running support device controls the turning output device and the haptic device based on the information of the running state such that the vehicle runs in the lane, and has a first control mode that controls the turning output control device and causes the reaction force device to operate in the normal operation mode, and a second control mode that controls the turning output control device and causes the reaction force device to operate in the haptic operation mode.

11 Claims, 6 Drawing Sheets

U.S. PATENT DOCUMENTS

| | | | |
|---|---|---|---|
| 5,913,375 A * | 6/1999 | Nishikawa | 180/168 |
| 6,092,619 A * | 7/2000 | Nishikawa et al. | 180/446 |
| 6,336,519 B1 * | 1/2002 | Bohner et al. | 180/403 |
| 6,728,615 B1 | 4/2004 | Yao et al. | |
| 6,838,846 B2 * | 1/2005 | Matsuoka | 318/432 |
| 7,073,621 B2 * | 7/2006 | Koibuchi et al. | 180/421 |
| 7,327,234 B2 | 2/2008 | Egami et al. | |
| 7,388,475 B2 * | 6/2008 | Litkouhi | 340/435 |
| 7,530,423 B2 * | 5/2009 | Limpibunterng et al. | 180/446 |
| 7,540,351 B2 * | 6/2009 | Kataoka et al. | 180/446 |
| 7,962,262 B2 * | 6/2011 | Kobayashi | 701/41 |
| 8,244,410 B2 * | 8/2012 | Wu et al. | 701/1 |
| 2002/0005315 A1 * | 1/2002 | Kind et al. | 180/444 |
| 2002/0169531 A1 * | 11/2002 | Kawazoe et al. | 701/41 |
| 2003/0120405 A1 * | 6/2003 | Laurent | 701/41 |
| 2004/0095369 A1 * | 5/2004 | Takeuchi et al. | 345/701 |
| 2004/0167695 A1 | 8/2004 | Braeuchle et al. | |
| 2004/0256171 A1 * | 12/2004 | Sugitani | 180/402 |
| 2005/0174223 A1 | 8/2005 | Egami et al. | |
| 2005/0269145 A1 * | 12/2005 | Schmidt | 180/204 |
| 2006/0217861 A1 * | 9/2006 | Ihara et al. | 701/41 |
| 2007/0051547 A1 * | 3/2007 | Fischer et al. | 180/204 |
| 2007/0213901 A1 * | 9/2007 | Shin et al. | 701/41 |

FOREIGN PATENT DOCUMENTS

| | | |
|---|---|---|
| JP | 2005-219719 A | 8/2005 |
| JP | 2006-178675 A | 7/2006 |
| JP | 2006-248304 A | 9/2006 |
| JP | 2006-282168 A | 10/2006 |
| WO | WO 03/055732 A1 | 7/2003 |

* cited by examiner

IN-LANE RUNNING SUPPORT SYSTEM, AUTOMOBILE AND IN-LANE RUNNING SUPPORT METHOD

CROSS-REFERENCE TO RELATED APPLICATIONS

This application claims priority from Japanese Patent Application Serial No. 2007-188274, filed Jul. 19, 2007, Japanese Patent Application Serial No. 2007-188275, filed on Jul. 19, 2007, and Japanese Patent Application Serial No. 2008-76283, filed on Mar. 24, 2008, each of which is incorporated herein in its entirety by reference.

TECHNICAL FIELD

The present invention pertains to a type of in-lane running support system that supports the in-lane running of a vehicle, a type of automobile, and an in-lane running support method.

BACKGROUND

There are commercially available LKS (Lane Keep Support Systems) and other operation support devices for maintaining in-lane running of a vehicle.

For the operation support devices, the support information for running in the lane is provided to the driver by the steering reaction force or other means corresponding to the lateral position in the lane where the vehicle runs.

For example, according to the technology described in Japanese Kokai Patent Application No. 2005-219719, changing of the seat shape notifies the driver of the vehicle's angle and lateral position in the lane of travel.

SUMMARY

Disclosed herein is an in-lane running support system that provides an improved feel for a driver of a vehicle. The in-lane running support system can include a steering input device that inputs steering operations by a driver, and a steering input detector that detects the steering operations inputted via the steering input device. One example of such an in-lane running support system as taught herein comprises a reaction force device that changes a condition of the steering input device between a normal operation mode that provides a normal reaction force to the driver via the steering input device, and a hapthic operation mode that performs a notification operation via the steering input device, a turning output device that is in a state mechanically disconnected from the steering input device and that turns steerable wheels, and a turning output controller that controls turning of the steerable wheels by the turning output device corresponding to the steering operations detected by the steering input detector. A running state detecting device acquires information of a running state of the vehicle with respect to a lane. An in-lane running support device controls the turning output device and the haptic device based on the information of the running state such that the vehicle runs in the lane, and wherein the in-lane running support device has a first control mode that controls the turning output control device and causes the reaction force device to operate in the normal operation mode, and a second control mode that controls the turning output control device and causes the reaction force device to operate in the haptic operation mode.

Also, an automobile taught herein can include a vehicle body, plural wheels mounted on the vehicle body, a steering input device that inputs steering operations by a driver, and a steering input detector that detects the steering operations inputted via the steering input device. One example of such an in-lane running support system as taught herein comprises a reaction force device that changes a condition of the steering input device between a normal operation mode that provides a normal reaction force to the driver via the steering input device, and a hapthic operation mode that performs a notification operation via the steering input device, a turning output device that is in a state mechanically disconnected from the steering input device and that turns steerable wheels, and a turning output controller that controls turning of the steerable wheels by the turning output device corresponding to the steering operations detected by the steering input detector. A running state detecting device acquires information of a running state of the vehicle with respect to a lane. An in-lane running support device controls the turning output device and the haptic device based on the information of the running state such that the vehicle runs in the lane, and wherein the in-lane running support device has a first control mode that controls the turning output control device and causes the reaction force device to operate in the normal operation mode, and a second control mode that controls the turning output control device and causes the reaction force device to operate in the haptic operation mode.

In addition, in-lane running support methods for a vehicle are also taught herein. One method taught herein can include detecting information of a running state of the vehicle with respect to a lane; and controlling a turning control of steerable wheels such that the vehicle runs in the lane and reaction force of a steering input device based on the information of the running state, wherein the controlling step has a first control mode that controls the steerable wheels and provides a normal reaction force to the driver via the steering input device, and has a second control mode that controls the steerable wheels and performs a notification operation via the steering input device.

In addition, computer readable storage medium, having stored data for in-lane running support control for a vehicle taught herein can include instructions for detecting information of a running state of the vehicle with respect to a lane; and instructions for controlling a turning control of steerable wheels such that the vehicle runs in the lane and reaction force of a steering input device based on the information of the running state, wherein the controlling instructions has a first control mode that controls the steerable wheels and provides a normal reaction force to the driver via the steering input device, and has a second control mode that controls the steerable wheels and performs a notification operation via the steering input device.

DETAILED DESCRIPTION OF EMBODIMENTS OF THE INVENTION

According to Japanese Kokai Patent Application No. 2005-219719, when the target running path in the support device and the running path intended by the driver are different from each other, the support information from the support device disconcerts the driver.

In particular, in the system that presents the support information, such as via steering reaction force in the steering system, the steering operation by the driver and control performed by the support device for presenting the support information may not match each other, so that driver discomfort becomes even more pronounced (for example, when the support information fights driver's intention).

In contrast, an in-lane running support system according to this disclosure solves the aforementioned problems by providing a scheme for supporting in-lane running while preventing driver discomfort.

In the following, an embodiment of an automobile to which the in-lane running support system is applied will be explained with reference to figures.

Embodiment 1

Figure 1:
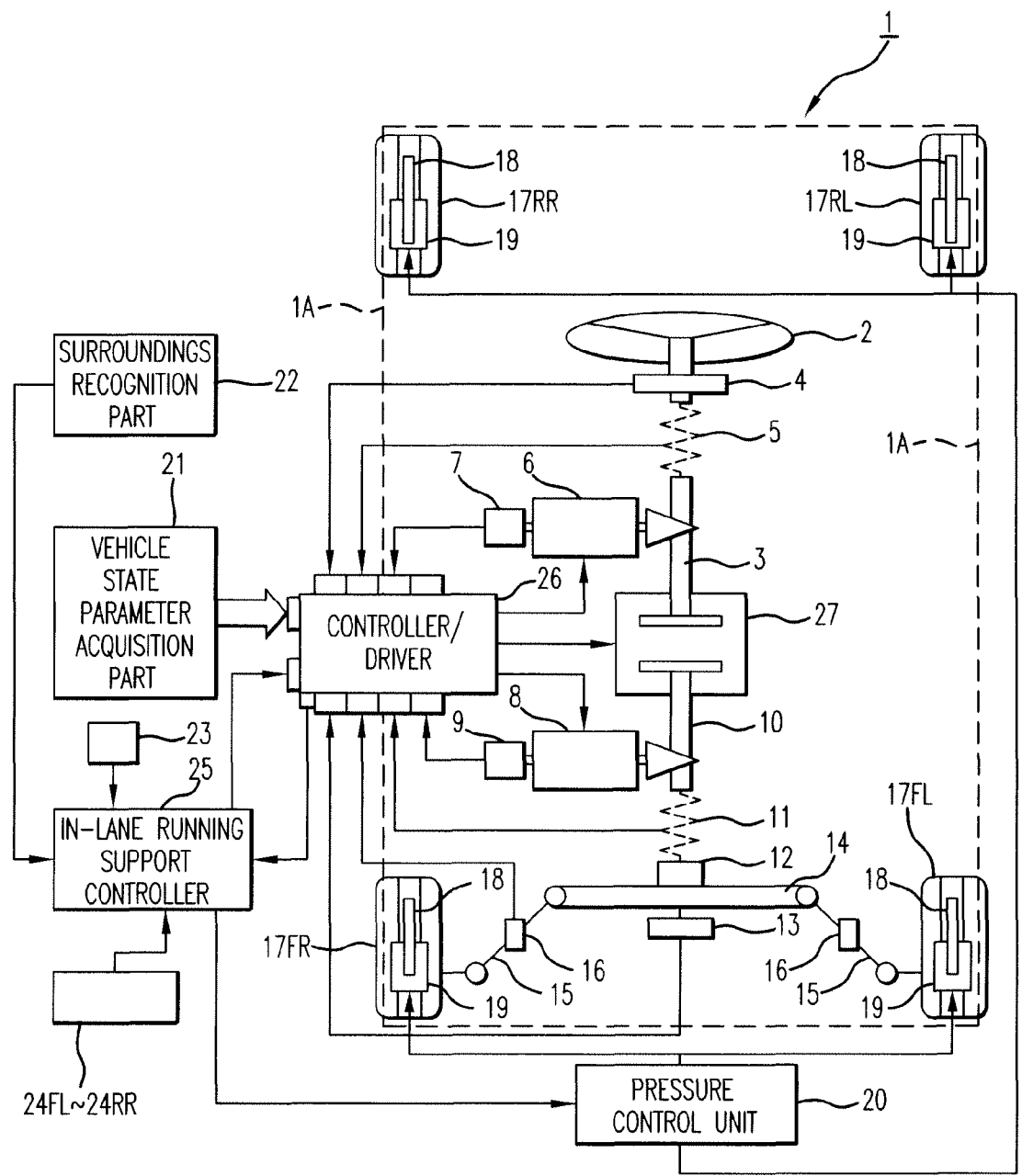
FIG. 1 is a schematic diagram illustrating the constitution of automobile 1 in Embodiment 1.

FIG. 1 is a schematic diagram illustrating the constitution of automobile 1 in Embodiment 1 of the present invention.

As shown in FIG. 1, the automobile 1 has the following parts: vehicle body 1A, steering wheel 2, input-side steering shaft 3, steering wheel angle sensor 4, steering torque sensor 5, steering reaction force actuator 6, steering reaction force actuator angle sensor 7, turning actuator 8, turning actuator angle sensor 9, output-side steering shaft 10, turning torque sensor 11, pinion gear 12, pinion angle sensor 13, rack gear 14, tie rods 15, tie rod axial force sensor 16, wheels 17FR, 17FL, 17RR, 17RL, brake disks 18, wheel cylinders 19, pressure control unit 20, vehicle state parameter acquisition part 21, surroundings recognition part 22, direction indicating switch 23, wheel speed sensors 24FR, 24FL, 24RR, 24RL, in-lane running support controller 25, controller/driver unit 26, and mechanical backup 27.

The steering wheel 2 is constructed such that it can rotate integrally with input-side steering shaft 3, so that the driver can transmit steering input to input-side steering shaft 3. The input-side steering shaft 3 has steering reaction force actuator 6, and a steering reaction force is applied by steering reaction force actuator 6 with respect to the steering input from steering wheel 2.

The steering wheel angle sensor 4 is set on input-side steering shaft 3, and it detects the rotational angle of input-side steering shaft 3 (that is, the steering angle of steering wheel 2 input by the driver). Here, steering wheel angle sensor 4 outputs the detected rotational angle of input-side steering shaft 3 to controller/driver unit 26.

The steering torque sensor 5 is set on input-side steering shaft 3, and it detects the rotational torque of input-side steering shaft 3 (that is, the steering input torque applied to steering wheel 2). The steering torque sensor 5 outputs the detected rotational torque of input-side steering shaft 3 to controller/driver unit 26.

The steering reaction force actuator 6 has a gear that rotates integrally with a motor shaft which is engaged with a gear formed on a portion of input-side steering shaft 3, and according to the instructions of controller/driver unit 26, it applies a reaction force with respect to the rotation of input-side steering shaft 3 by steering wheel 2.

The steering reaction force actuator angle sensor 7 detects the rotational angle of steering reaction force actuator 6 (that is, the rotational angle due to the steering input transmitted to steering reaction force actuator 6), and outputs the detected rotational angle to controller/driver unit 26.

The turning actuator 8 has a gear that rotates integrally with a motor shaft engaged with a gear formed on a portion of output-side steering shaft 10, and it drives output-side steering shaft 10 to rotate according to the instructions of controller/driver unit 26.

The turning actuator angle sensor 9 detects the rotational angle of turning actuator 8 (that is, the rotational angle for turning output by turning actuator 8), and outputs the detected rotational angle to controller/driver unit 26.

The output-side steering shaft 10 is associated with turning actuator 8, and transmits the rotation input by turning actuator 8 to pinion gear 12.

The turning torque sensor 11 is set on output-side steering shaft 10, and it detects the rotational torque of output-side steering shaft 10 (that is, the rotational torque applied to wheels 17FR, 17FL via rack gear 14). The turning torque sensor 11 outputs the rotational torque of output-side steering shaft 10 to controller/driver unit 26.

The pinion gear 12 is engaged with rack gear 14, and it transmits the rotation input from output-side steering shaft 10 to rack gear 14.

The pinion angle sensor 13 detects the rotational angle of pinion gear 12 (that is, the turning angle of wheels 17FR, 17FL output via rack gear 14), and outputs the detected rotational angle of pinion gear 12 to controller/driver unit 26.

The rack gear 14 has spur teeth engaged with pinion gear 12, and it converts the rotation of pinion gear 12 to a linear movement in the vehicle's width direction.

The tie rods 15 connect the two end portions of rack gear 14 with the knuckle arms of wheels 17FR, 17FL via ball joints, respectively.

The tie rod axial force sensor 16 is set on each tie rod 15 arranged on the two ends of rack gear 14, and it detects the axial force acting on tie rod 15. The tie rod axial force sensor 16 outputs the detected axial force for each tie rod 15 to controller/driver unit 26.

The wheels 17FR, 17FL, 17RR, 17RL are mounted on vehicle body 1A via suspension. Among these, as the knuckle arms for front wheels (wheels 17FR, 17FL) are rocked by tie rods (15), wheels 17FR, 17FL are reoriented with reference to vehicle body 1A.

Brake disks 18 are rotated integrally with wheels 17FR, 17FL, 17RR, 17RL, and the brake pads are pressed against them by pressure from wheel cylinders 19, with the frictional forces leading to braking forces.

The wheel cylinders 19 generate pressure for pressing the brake pads respectively provided on wheels 17FR, 17FL, 17RR, 17RL against brake disks 18.

Under the instructions of in-lane running support controller 25, pressure control unit 20 controls the pressures of wheel cylinders 19 with which wheels 17FR, 17FL, 17RR, 17RL are equipped.

The vehicle state parameter acquisition part 21 acquires the operation signals of direction indicating switch 23 and the output signals of surroundings recognition part 22. The vehicle state parameter acquisition part 21 acquires the vehicle speed based on the pulse signals indicating the rotational speeds of the wheels output from wheel speed sensors 24FR, 24FL, 24RR, 24RL. In addition, vehicle state parameter acquisition part 21 acquires the slip rate for each wheel based on the vehicle speed and the rotational speed of each wheel. The vehicle state parameter acquisition part 21 then outputs the acquired parameters to controller/driver unit 26.

The surroundings recognition part 22 has cameras (such as single-lens cameras) for taking pictures of the vehicle surroundings, and a computing device that analyzes the picked-up images and computes the angle between the longitudinal direction of the vehicle and the running lane (yaw angle of the vehicle) φr, lateral displacement X from the lane center, and curvature ρ of the running lane. The surroundings recognition part 22 then outputs the yaw angle φr, lateral displacement X from the lane center, and curvature ρ of the running lane computed by the computing device to controller/driver unit 26.

The direction indicating switch 23 turns ON the direction indicating lamps indicating the left/right directions corresponding to the operation of the direction indicating lever by the driver. When direction indicating switch 23 performs the direction indicating operation, it outputs the operation signal indicating the direction to in-lane running support controller 25.

The wheel speed sensors 24FR, 24FL, 24RR, 24RL output the pulse signals indicating the rotational speeds of the wheels to vehicle state parameter acquisition part 21 and in-lane running support controller 25.

The following signals are inputted to the in-lane running support controller 25: pulse signals indicating the rotational speeds of the various wheels from wheel speed sensors 24FR, 24FL, 24RR, 24RL, the operation signal indicating direction from direction indicating switch 23, in-lane running support information from surroundings recognition part 22, and the steering input state (steering input angle, steering input torque, etc.) and the turning output state (turning angle, turning torque, etc.) from controller/driver unit 26. Then, based on the input information, in-lane running support controller 25 executes the in-lane running support processing to be explained later. That is, in-lane running support controller 25 computes the parameters pertaining to vehicle control for running the vehicle along the target track within the lane (turning of front wheels 17FR, 17FL, steering reaction force applied to input-side steering shaft 3, and braking forces of wheels 17FR, 17FL, 17RR, 17RL, etc.). In addition, in-lane running support controller 25 outputs the computed parameters pertaining to the braking forces of the wheels to pressure control unit 20. Also, in-lane running support controller 25 outputs the computed parameters pertaining to turning of the front wheels and the steering reaction force applied to input-side steering shaft 3 to controller/driver unit 26.

The controller/driver unit 26 controls the overall automobile 1. Based on the signals inputted from the sensors set at the various portions and from in-lane running support controller 25, it outputs the steering reaction force for input-side steering shaft 3, the turning angle of the front wheels, and for connection of mechanical backup 27, various types of control signals to steering reaction force actuator 6, turning actuator 8, mechanical backup 27, etc.

Also, controller/driver unit 26 converts the values detected by the sensors to values corresponding to the application purpose. For example, controller/driver unit 26 converts the rotational angle detected by steering reaction force actuator angle sensor 7 to the steering input angle, converts the rotational angle detected by turning actuator angle sensor 9 to the turning angle of the wheels, and converts the rotational angle of pinion gear 12 detected by pinion angle sensor 13 to the turning angle of the wheels.

Here, controller/driver unit 26 outputs the information pertaining to the state of steering input and the state of turning output to in-lane running support controller 25.

The controller/driver unit 26 monitors the rotational angle of input-side steering shaft 3 detected by steering wheel angle sensor 4, the rotational angle of steering reaction force actuator 6 detected by steering reaction force actuator angle sensor 7, the rotational angle of turning actuator 8 detected by turning actuator angle sensor 9, and the rotational angle of pinion gear 12 detected by pinion angle sensor 13, and, based on these relationships, it can detect the generation of failures in the steering system. In the event that failure generation in the steering system is detected, controller/driver unit 26 outputs an instruction signal for connection between input-side steering shaft 3 and output-side steering shaft 10 to mechanical backup 27.

In addition to the steering reaction force due to the control signal input from in-lane running support controller 25, the controller/driver unit 26 also outputs a control signal for generating a steering reaction force torque (counter force to the driver's operation) corresponding to the difference between target turning angle θopt and the actual turning angle θd of turning actuator 8 to steering reaction force actuator 6 (normal reaction force).

In addition, corresponding to the rotational angle of steering reaction force actuator 6 detected by steering reaction force actuator angle sensor 7, controller/driver unit 26 outputs a control signal to turning actuator 8 for controlling the turning angle of front wheels 17FR, 17FL According to the instructions of controller/driver unit 26, mechanical backup 27 connects input-side steering shaft 3 and output-side steering shaft 10, and this mechanism thus guarantees the transmission of force from input-side steering shaft 3 to output-side steering shaft 10. Here, mechanical backup 27 is normally instructed by controller/driver unit 26 not to connect input-side steering shaft 3 with output-side steering shaft 10. In case it is necessary to perform steering operation without going through steering wheel angle sensor 4, steering torque sensor 5 and turning actuator 8 due to a failure in the steering system, an instruction is generated to connect input-side steering shaft 3 with output-side steering shaft 10.

Also, mechanical backup 27 can be formed for example, from a cable type steering mechanism or the like.

In-Lane Running Support Processing

Figure 2:
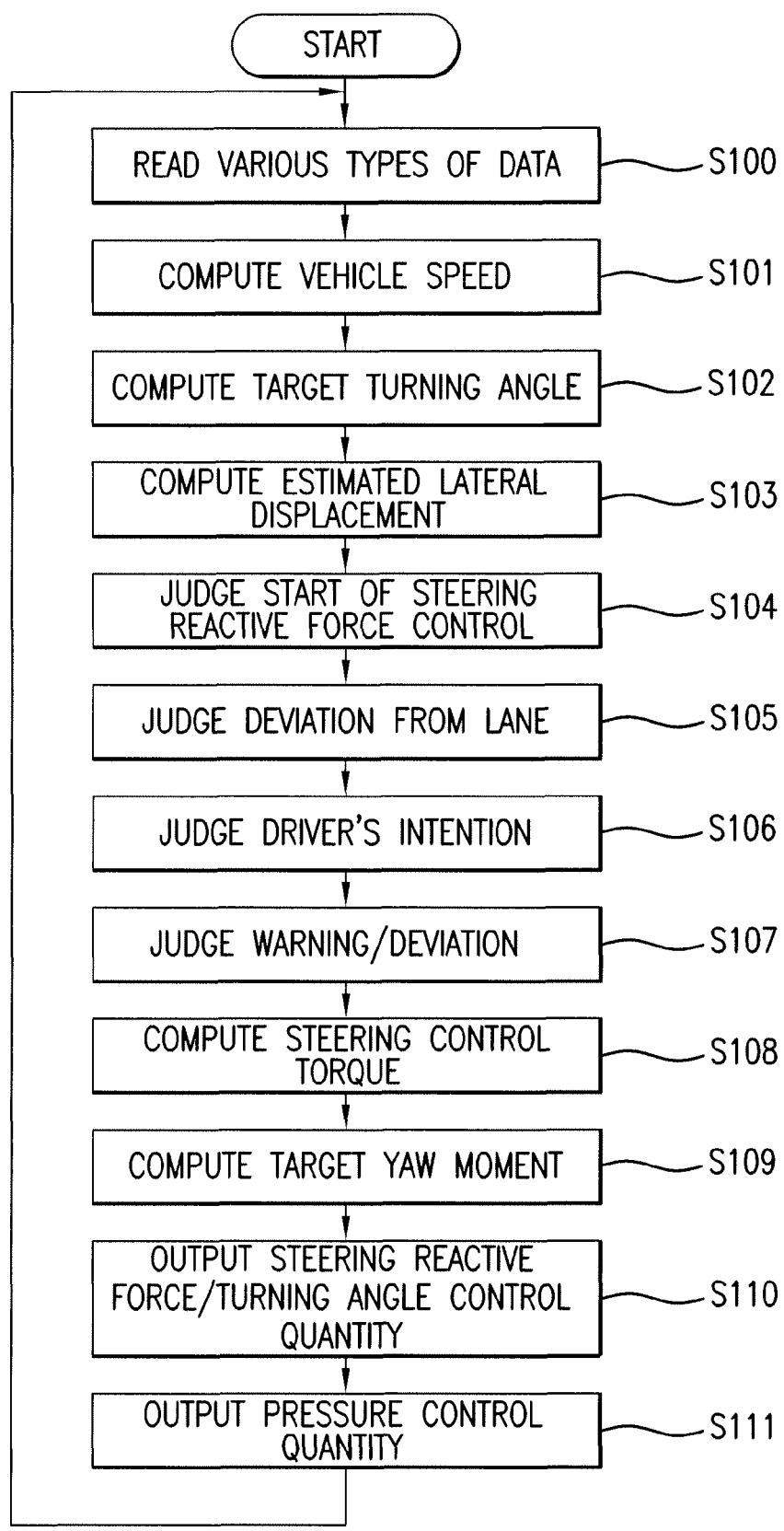
FIG. 2 is a flow chart illustrating the in-lane running support processing executed by in-lane running support controller 25.

FIG. 2 is a flow chart illustrating the in-lane running support processing executed by in-lane running support controller 25.

As shown in FIG. 2, the in-lane running support processing is executed by the operating system that controls automobile 1 at prescribed time intervals by interrupt processing.

As shown in FIG. 2, when the in-lane running support processing is started, in step S100 in-lane running support controller 25 first of all reads the various types of data output from the various devices and sensors.

More specifically, in-lane running support controller 25 reads from controller/driver unit 26 the steering angle θs output from steering reaction force actuator angle sensor 7, and turning angle θt obtained by converting the rotational angle output from turning actuator angle sensor 9. Also, in-lane running support controller 25 converts the pulse signals indicating the rotational speeds of the wheels output from wheel speed sensors 24FR, 24FL, 24RR, 24RL to wheel velocities Vwi (i=1-4) of the various wheels, and reads the converted results.

Also, in-lane running support controller 25 reads the in-lane running support information (vehicle yaw angle φr with respect to the running lane, lateral displacement X from the lane center, and curvature ρ of the running lane) computed by surroundings recognition part 22, and the operation signal of direction indicating switch 23.

The various types of information used in the in-lane running support processing that are read in step S100 will be referred to as "vehicle parameters" in the following.

Process flow then goes to step S101, and in-lane running support controller 25 computes vehicle speed V based on wheel velocities Vwi of wheels 17FR, 17FL, 17RR, 17RL read in step S100.

More specifically, in the normal running mode, vehicle speed V is computed using the following equation (1) or equation (2) based on wheel velocities Vwi of wheels 17FR, 17FL, 17RR, 17RL.

(In the Case of Front Wheel Drive)

$$V=(Vw3+Vw4)/2 \tag{1}$$

(In the Case of Rear Wheel Drive)

$$V=(Vw1+Vw2)/2 \tag{2}$$

Also, in the event that the ABS (Antilock Brake System) control is turned ON, the vehicle body speed estimated in the ABS control is adopted as vehicle speed V.

Also, as the wheel velocities Vwi used in computing vehicle speed V, instead of wheel velocities Vwi obtained based on the values detected by wheel speed sensors 24FR, 24FL, 24RR, 24RL, it is possible to use vehicle velocity VAT (km/h) computed using the following equation (3) based on AT (Automatic Transmission) output shaft rotational speed W [rpm] and wheel radius/differential gear ratio R [m].

$$VAT=(2\pi \cdot R)\cdot W\cdot (60/1000) \tag{3}$$

Then process flow goes to step S102, and in-lane running support controller 25 computes target turning angle θopt for making the vehicle track the lane ahead of it based on the vehicle parameters.

More specifically, the following computing is executed based on the vehicle parameters.

Figure 3:
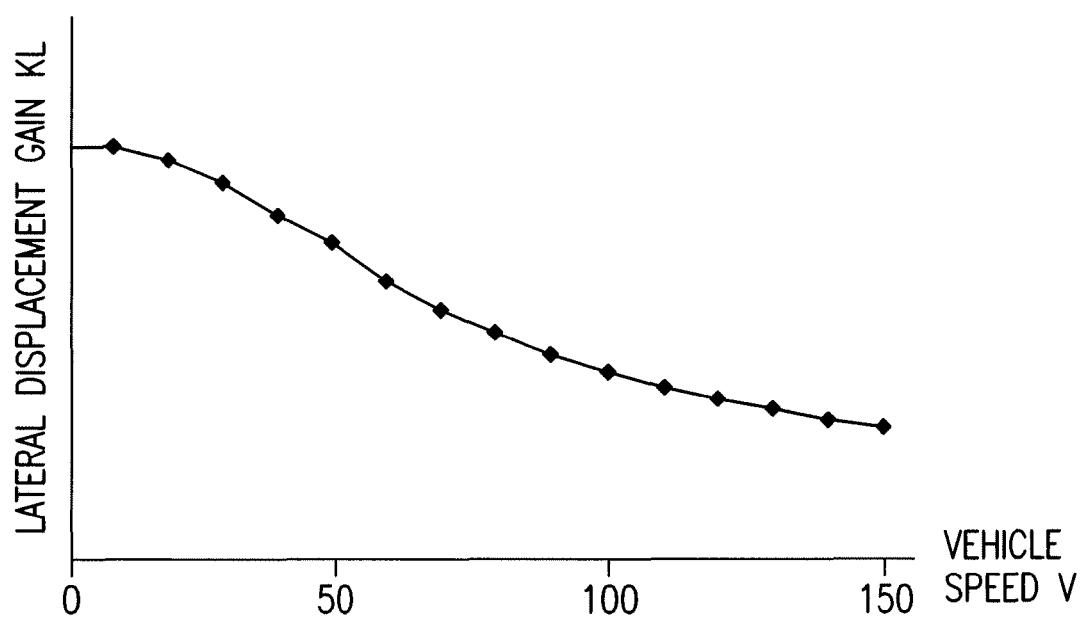
FIG. 3 is a diagram illustrating lateral displacement gain KL set for lateral displacement X from the lane center based on vehicle speed.
Figure 4:
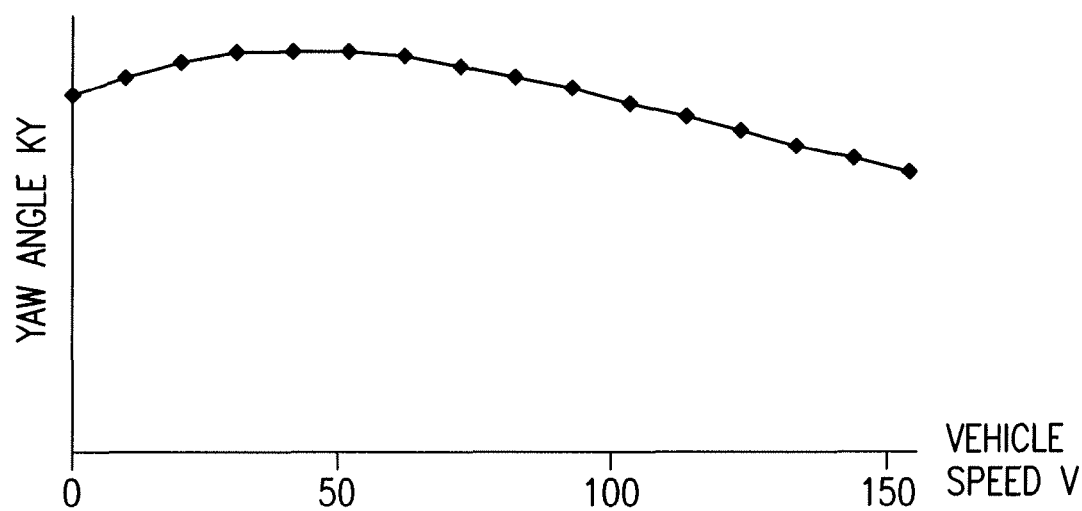
FIG. 4 is a diagram illustrating yaw angle gain KY set for yaw angle φr based on vehicle speed.
Figure 5:
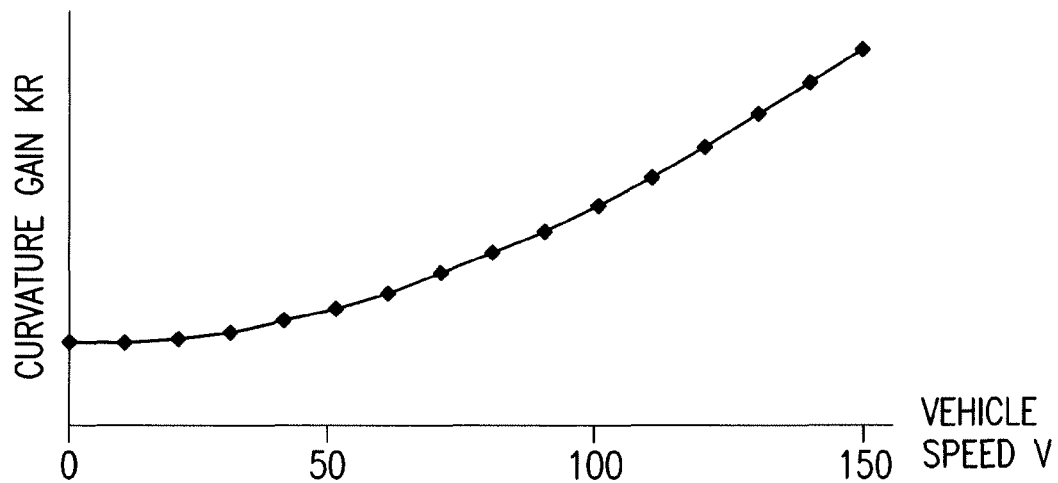
FIG. 5 is a diagram illustrating curvature gain KR set for curvature ρ of the running lane based on vehicle speed.
Figure 6:
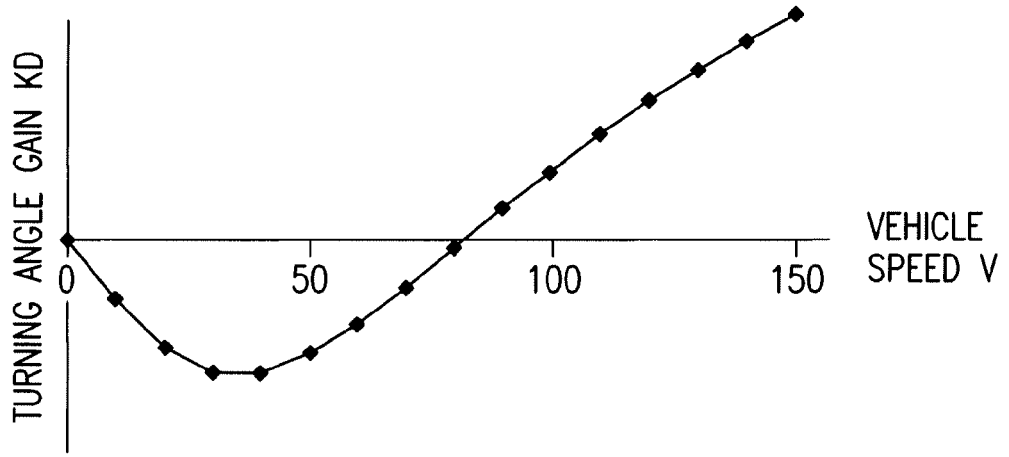
FIG. 6 is a diagram illustrating turning angle gain KD set for turning angle θt.

FIG. 3 is a diagram illustrating lateral displacement gain KL set for lateral displacement X; FIG. 4 is a diagram illustrating yaw angle gain KY set for yaw angle φr; FIG. 5 is a diagram illustrating curvature gain KR set for curvature ρ of the running lane; and FIG. 6 is a diagram illustrating turning angle gain KD set for turning angle θt.

In step S102, step S102 computes target turning angle θopt by multiplying said lateral displacement gain KL, yaw angle gain KY, curvature gain KR and turning angle gain KD by said vehicle parameters (lateral displacement X from the lane center, yaw angle φr, curvature ρ of the running lane and turning angle θt), respectively, followed by adding the products.

Process flow then goes to step S103, and in-lane running support controller 25 computes estimated lateral displacement Xs.

More specifically, using the following equation estimated future lateral displacement Xs is computed from vehicle yaw angle φr with respect to the running lane, lateral displacement X from the lane center, and curvature ρ of the running lane that have been read in step S100, as well as vehicle speed V computed in step S101.

$$Xs=Tt\cdot V\cdot (\phi r+Tt\cdot V\cdot \rho)+X \tag{4}$$

Here, Tt represents the headway time used for computing the forward viewing distance, and the forward viewing distance is the product of the headway time Tt and vehicle speed V. That is, the estimated lateral displacement from the center of the running lane after headway time Tt becomes the estimated future lateral displacement Xs.

Process flow then goes to step S104, and in-lane running support controller 25 judges whether control of the steering reaction force for supporting in-lane running is started (hereinafter to be referred to as "judgment of start of steering reaction force control").

That is, in-lane running support controller 25 compares steering reaction force judgment threshold XL1 and estimated lateral displacement Xs. Here, in-lane running support controller 25 judges as follows: if one has $$|Xs|\geq XL1 \tag{5}$$

it judges that steering reaction force control (haptic operation mode) is started, and steering reaction force control start judgment flag Fstr is set in the state indicating that control of the steering reaction force is ON (Fstr=ON). On the other hand, if $$|Xs|<XL1 \tag{6}$$

in-lane running support controller 25 judges that steering reaction force control is not performed (normal operation mode), and the steering reaction force control start judgment flag Fstr is set in the state indicating that steering reaction force control is OFF (Fstr=OFF).

Also, in this case, in-lane running support controller 25 judges displacement direction parameter Dstr indicating the direction of left or right displacement with respect to the center of the running lane based on lateral displacement. When there is displacement to the right side from the center of the running lane, in-lane running support controller 25 sets Dstr at right (Dstr=right), and when there is displacement to the left side from the center of the running lane, it sets Dstr at left (Dstr=left).

Then, process flow goes to step S105, and in-lane running support controller 25 judges whether the vehicle tends to deviate from the lane.

More specifically, first of all, deviation judgment threshold XL set to indicate the level of a tendency to deviate from the lane is compared with estimated lateral displacement Xs computed in the step S103. Then, when $$|Xs|\geq XL \tag{7}$$

in-lane running support controller 25 judges that there is a high tendency to deviate from the lane, and sets deviation judgment flag Fout indicating that control to prevent deviation from the lane is ON (Fout=ON). On the other hand, if $$|Xs|<XL \tag{8}$$

in-lane running support controller 25 judges that the tendency to deviate from the lane is not high, and it sets deviation judgment flag Fout OFF, that is control to prevent deviation from the lane is OFF (Fout=OFF).

Also, in this case, in-lane running support controller 25 judges deviation direction parameter Dout indicating the direction of the tendency to deviate (left/right) from the center of the running lane based on lateral displacement X from the lane center. When there is a tendency to deviate to the right side from the center of the running lane, Dout is set as right (Dout=right). When there is a tendency to deviate from the lane to the left side, Dout is set as left (Dout=left).

Here, deviation judgment threshold XL is normally set higher than steering reaction force judgment threshold XL1. This means that deviation judgment threshold XL is set at a position farther from the center of the running lane.

When deviation judgment threshold XL and steering reaction force judgment threshold XL1 are set equal to each other, the timing is the same for starting control of the steering reaction force and control to prevent deviation from the lane.

Then process flow goes to step S106, and in-lane running support controller 25 judges whether the driver is performing the lateral displacement intentionally (hereinafter to be referred to as "judgment of driver's intention").

More specifically, a judgment is first made as to whether direction indicating switch 23 is operated based on the operation signal of direction indicating switch 23 read in step S100.

Then, when direction indicating switch 23 is operated, in-lane running support controller 25 judges whether direction Q indicated by the signal of direction indicating switch 23 and displacement direction parameter Dstr judged in step S104 are the same.

When direction Q indicated by the signal of direction indicating switch 23 and displacement direction parameter Dstr are the same, in-lane running support controller 25 judges that the driver is intentionally performing a lateral displacement, and steering reaction force control start judgment flag Fstr set in step S104 is set OFF. On the other hand, if direction Q indicated by the signal of direction indicating switch 23 is different from displacement direction parameter Dstr, in-lane running support controller 25 judges that the lateral displacement is not intended by the driver, and the state of steering reaction force control start judgment flag Fstr is maintained as is.

Also, when direction indicating switch 23 is not operated, in-lane running support controller 25 judges whether the driver is steering the vehicle in a direction to increase the tendency to deviate from the lane based on steering angle θs read in step S100. When the driver steers in a direction to increase the tendency to deviate from the lane, and if steering angle θs and variation per unit time Δθs of the steering angle exceed the preset levels, in-lane running support controller 25 judges that the driver intends to tolerate the lateral displacement, and steering reaction force control start judgment flag Fstr set in step S104 is set OFF.

Also, as a method for judging the intention of the driver, for example, instead of the steering angle θs and variation per unit time Δθs of the steering angle, one may also use steering torque Ts obtained from steering torque sensor 5 to make the judgment.

Also, just as was the case with steering reaction force control start judgment flag Fstr, for deviation judgment flag Fout in-lane running support controller 25 judges whether direction Q indicated by the signal of direction indicating switch 23 and deviation direction parameter Dout judged in step S105 are the same.

When direction Q indicated by the signal of direction indicating switch 23 and deviation direction parameter Dout are the same, it is judged that the driver intends to deviate from the lane, and deviation judgment flag Fout set in step S105 is set OFF. On the other hand, if direction Q indicated by the signal of direction indicating switch 23 and deviation direction parameter Dout are different from each other, in-lane running support controller 25 judges that the deviation from the lane is not intended by the driver, and the state of deviation judgment flag Fout is maintained as is.

When direction indicating switch 23 is not operated, in-lane running support controller 25 judges whether the driver is steering in a direction to increase the tendency to deviate from the lane based on steering angle θs read in step S100. When the driver steers in the direction to increase the tendency to deviate from the lane, if steering angle θs and variation per unit time Δθs of the steering angle exceed preset levels, in-lane running support controller 25 judges that the driver intends to deviate from the lane, and deviation judgment flag Fout set in step S105 is set OFF.

Process flow then goes to step S107, and in-lane running support controller 25 judges whether the driver should be warned of the tendency of the vehicle to deviate from the lane (such as by a warning by means of an alarm beep), and whether control to prevent deviation should be performed in addition to the warning.

More specifically, a judgment is made as to whether deviation judgment flag Fout set in step S105 is ON. If it is ON, that is, if estimated future lateral displacement Xs≧XL and deviation from the lane is not the intention of the driver, a warning is issued.

The timing for the warning may be different from that for performing control to prevent deviation. For example, a scheme can be adopted in which first a warning is issued in step S107, and after a certain delay, control to prevent deviation is executed in step S110, to be explained later. When control to prevent deviation is performed after a certain delay, notification to the driver of the possibility of deviation from the lane can be performed according to the running state, and it is possible to further reduce chance of a mismatch between driver operation and control by the system.

Also, when brake control is performed during control to prevent deviation, because the deceleration caused by braking can be felt by the driver, the control operation itself can have the effect of a warning.

Then process flow goes to step S108, and in-lane running support controller 25 computes the steering reaction force (steering control torque Tstr) applied to input-side steering shaft 3 for the haptic control which notifies the driver of the lateral displacement of the vehicle.

More specifically, a judgment is first made as to whether steering reaction force control start judgment flag Fstr set in step S104 is ON. If it is ON (second control mode), based on the estimated future lateral displacement Xs computed in step S103 and steering reaction force judgment threshold XL1, steering control torque Tstr for notifying the driver of the lateral displacement of the vehicle is computed using the following equation:

$$Tstr = Kstr1 \cdot Kstr2 \cdot (|Xs| - XL1) \quad (9)$$

Here, Kstr1 represents the proportional gain determined from the various parameters of the vehicle, and Kstr2 represents the proportional gain that varies according to vehicle speed V.

Figure 7:
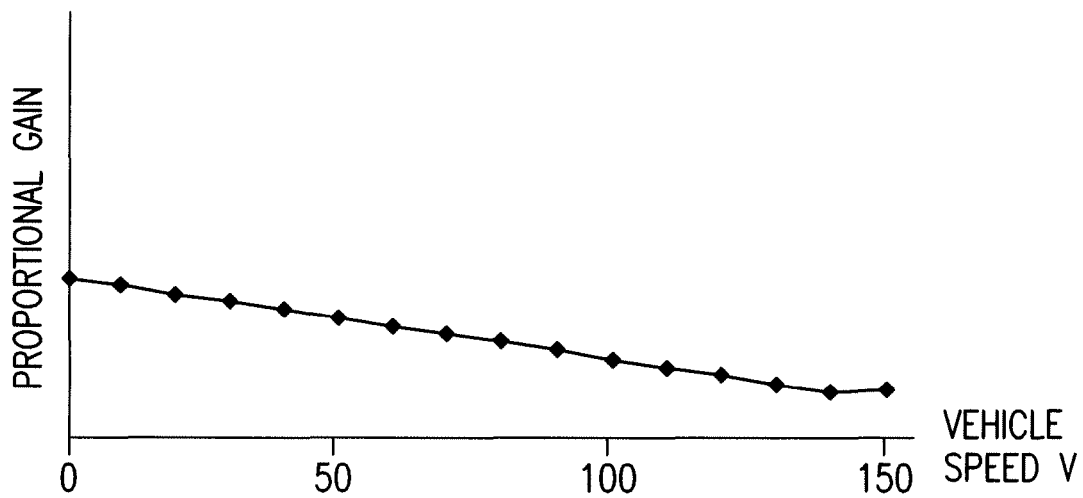
FIG. 7 is a diagram illustrating proportional gain Kstr2 that varies according to vehicle speed V.

FIG. 7 is a diagram illustrating proportional gain Kstr2 that varies according to vehicle speed V.

Also, in step S108, when steering reaction force control start judgment flag Fstr=OFF (first control mode), steering control torque Tstr for notifying the driver of the lateral displacement of the vehicle is set at 0 (that is, only the steering reaction force according to the conventional steering reaction force (normal reaction force) characteristics is supplied).

Then process flow goes to step S109, and in-lane running support controller 25 computes target yaw moment Ms generated in the vehicle.

In this application example, based on estimated future lateral displacement Xs and deviation judgment threshold XL, target yaw moment Ms is computed using the following equation.

However, it is also possible to use lateral displacement X from the lane center in place of estimated lateral displacement Xs. Any of these can be used, and for example, it can be determined according to vehicle speed V. That is, when vehicle speed V is higher than vehicle speed threshold Vth2, estimated lateral displacement Xs is used, and when it is lower than vehicle speed threshold Vth2, lateral displacement X from the lane center is used.

$$Ms = K1 \cdot K2 \cdot (|Xs| - XL) \tag{10}$$

Here, K1 represents a proportional gain determined from the various parameters of the vehicle, and K2 represents a proportional gain that varies according to vehicle speed V.

Figure 8:
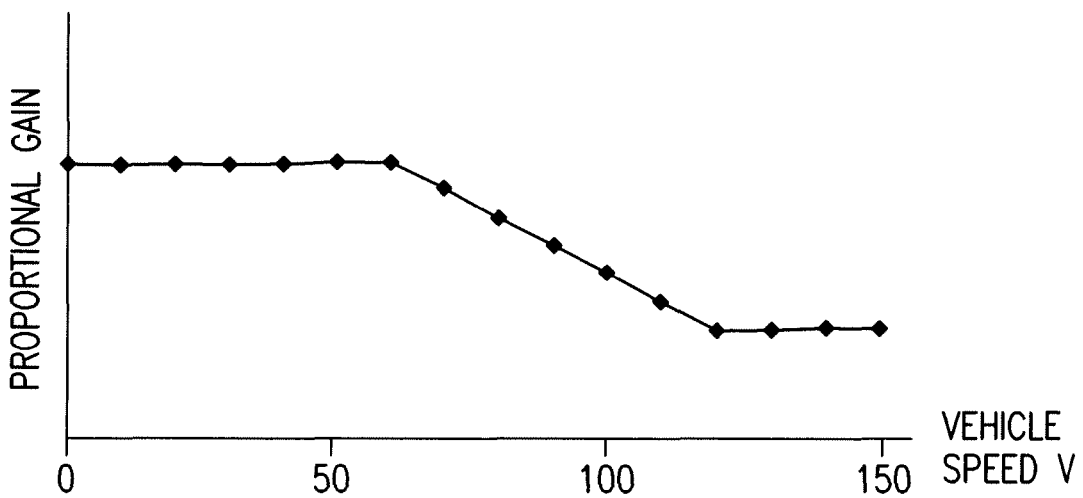
FIG. 8 is a diagram illustrating proportional gain K2 that varies according to vehicle speed V.

FIG. 8 is a diagram illustrating proportional gain K2 that varies according to vehicle speed V.

In step S109, when deviation judgment flag Fout=OFF, target yaw moment Ms is set at 0.

Then process flow goes to step S110, and in-lane running support controller 25 judges whether steering reaction force control start judgment flag Fstr set in step S104 is ON. If the steering reaction force control start judgment flag Fstr is ON, in-lane running support controller 25 sends to controller/driver unit 26 an instruction for control of turning actuator 8 so that the turning angle will match target turning angle θopt, and it sends an instruction for control of steering reaction force actuator 6 to the controller/driver unit such that the steering reaction force is increased by steering control torque Tstr.

On the other hand, when steering reaction force control start judgment flag Fstr is OFF, in-lane running support controller 25 sends to controller/driver unit 26 an instruction for control of turning actuator 8 so that the turning angle will match target turning angle θopt, and it sends an instruction for control of steering reaction force actuator 6 to the controller/driver unit so that the steering control torque Tstr becomes "0" and the steering reaction force for notifying the driver of the lateral displacement of the vehicle becomes "0" (that is, only the steering reaction force according to the conventional steering reaction force characteristics is supplied).

Then process flow goes to step S111, and in-lane running support controller 25 judges whether deviation judgment flag Fout is ON. If deviation judgment flag Fout is ON, the in-lane running support controller 25 outputs an instruction to pressure control unit 20 to produce a pressure differential in wheel cylinders 19 of the left/right wheels such that the yaw moment matches target yaw moment Ms, and process flow then goes to step S100.

On the other hand, if deviation judgment flag Fout is OFF, in-lane running support controller 25 sets target yaw moment Ms at "0", and outputs an instruction to pressure control unit 20 to produce a pressure differential in wheel cylinders 19 of the left/right wheels such that the yaw moment becomes "0".

Operation

The operation will be explained in the following.

Now, assume that the driver of automobile 1 drives the vehicle within the running lane.

In this case, automobile 1 executes in-lane running support processing, and in-lane running support controller 25 reads various types of data from the various sensors arranged on automobile 1.

Here, automobile 1 uses wheel velocities Vwi of the various wheels to compute vehicle speed V, and computes target turning angle θopt from the vehicle parameters (lateral displacement X from the lane center, yaw angle φr, curvature ρ of the running lane, and turning angle θt).

In addition, automobile 1 computes estimated future lateral displacement Xs (after headway time Tt), and compares estimated lateral displacement Xs with steering reaction force judgment threshold XL1 to judge whether steering reaction force control for in-lane running support is performed.

Then, automobile 1 compares estimated lateral displacement Xs with deviation judgment threshold XL to judge whether control to prevent deviation from the lane is performed.

Then, automobile 1 judges whether the driver performs lateral displacement intentionally judgment of the driver's intention). For example, when the direction indicated by direction indicating switch 23 and the lateral displacement direction are the same, or direction indicating switch 23 is not operated, and the operation is performed such that the tendency to deviate from the lane increases, it is judged that the driver intentionally performs the lateral displacement. In such a case, because control of the steering reaction force for in-lane running support is not needed, control of the steering reaction force is turned OFF.

On the other hand, if it is judged that the driver does not intentionally cause lateral displacement, such as when the direction indicated by direction indicating switch 23 and the lateral displacement direction differ from each other, the lateral displacement of the vehicle occurs although the driver has no such intention, so that control of the steering reaction force for in-lane running support is kept ON.

Similarly, automobile 1 judges whether the driver intentionally deviates from the lane judgment of the driver's intention), and for example, when the direction indicated by direction indicating switch 23 and the direction of deviation from the lane are the same, or direction indicating switch 23 is not operated, yet the driver performs an operation causing an increased tendency to deviate from the lane, it is judged that the driver intentionally deviates from the lane, there is no need to perform control to prevent deviation from the lane, and control to prevent deviation from the lane is turned OFF.

On the other hand, when the direction indicated by direction indicating switch 23 and the direction of deviation from the lane are different from each other, and it is judged that the driver is not intentionally trying to deviate from the lane, because the tendency of the vehicle to deviate from the lane occurs while the driver has no such intention, control to prevent deviation from the lane is kept ON.

Also, automobile 1 judges whether a warning is issued to the driver about the tendency of the vehicle to deviate from the lane. That is, when estimated future lateral displacement Xs is larger than deviation judgment threshold XL, and the driver does not intentionally try to deviate from the lane, it is judged that a warning should be made to the driver.

Then, corresponding to the difference between estimated lateral displacement Xs and steering reaction force judgment threshold XL1, automobile 1 computes the steering reaction force applied to the input-side steering shaft. Also, automobile 1 computes the target yaw moment corresponding to the difference between estimated lateral displacement Xs and deviation judgment threshold XL.

Then, when automobile 1 sets control of the steering reaction force for in-lane running support (steering reaction force control start judgment flag Fstr is set ON: second control mode), turning actuator 8 is controlled to make the turning angle match target turning angle θopt, and steering reaction force actuator 6 is controlled so that the steering reaction force is increased by steering control torque Tstr.

As a result, control of the turning angle for the in-lane running support and control of the steering reaction force are performed while presentation of information to the driver is performed.

On the other hand, when control of the steering reaction force for in-lane running support for automobile 1 is set OFF (steering reaction force control start judgment flag Fstr is OFF: first control mode), turning actuator 8 is controlled such that the turning angle matches target turning angle θopt, and an instruction to set steering control torque Tstr=0 is output to steering reaction force actuator 6, so that the steering reaction force becomes normal reaction force.

In addition, when automobile 1 tends to deviate from the lane without the intention of the driver (when deviation judgment flag Fout is ON), an instruction is sent to pressure control unit 20 such that the yaw moment matches target yaw moment Ms, and when there is no tendency of the vehicle to deviate from the lane that is unintended by the driver (when deviation judgment flag Fout is OFF), an instruction for setting target yaw moment Ms at "0" is output to pressure control unit 20.

As a result, when the vehicle tends to deviate from the lane with no such driver intention, deviation from the lane is prevented by means of control of the yaw moment via the braking force.

That is, in-lane running support is usually performed by control of the turning angle to correspond to target turning angle θopt for automobile 1 (first control mode), and when estimated lateral displacement Xs exceeds steering reaction force judgment threshold XL1, in-lane running support is performed by means of control of the steering reaction force to cause the vehicle to run within the lane while the driver steers (second control mode).

Consequently, when a small lateral displacement takes place due to a banked road surface, control to prevent deviation from the lane can be performed appropriately without a notification being issued to the driver by means of the steering reaction force, only control of the steering angle is performed, while the operation of notification by means of the steering reaction force is not performed. Then when a lateral displacement exceeding a preset level occurs, the operation of notification by means of the steering reaction force is performed.

Also, for automobile 1, when estimated lateral displacement Xs exceeds deviation judgment threshold XL, control is performed by the in-lane running support operation so that the braking forces of the wheels will generate a yaw moment to cause the vehicle to run within the lane.

Consequently, when the tendency to deviate from the lane becomes significant, in addition to performance of the in-lane running support operation by means of the steering system, control of the yaw moment by control of braking of the wheels is also performed to prevent deviation from the lane.

As explained above, in this embodiment, in-lane running support notification of the driver of automobile 1 by means of the steering reaction force, and control of in-lane running support or control to prevent deviation from the lane by controlling turning of the wheels are executed under conditions that differ from each other.

As a result, it is possible to perform in-lane running support while preventing driver discomfort.

Also, because notification by means of the steering reaction force or control to prevent deviation from the lane is performed by the steering reaction force based on judgment of the intention of the driver, it is possible to perform control for in-lane running support and to avoid any mismatch with the intention of the driver even more effectively.

Also, because the timing of driver notification and the timing for starting control to prevent deviation from the lane differ from each other, it is possible to perform the actual control to prevent deviation from the lane after the driver is notified of the direction of control in the in-lane running support operation, so that it is possible to perform control of the vehicle in the in-lane running support operation while coordinating notification of the driver and control to prevent deviation of the vehicle from the lane.

Also, in this embodiment, steering wheel 2 and input-side steering shaft 3 form the steering input means, and steering wheel angle sensor 4 and steering torque sensor 5 form the steering input detection means. Also, steering reaction force actuator 6 and steering reaction force actuator angle sensor 7 form a reaction force means, and output-side steering shaft 10, pinion gear 12, rack gear 14, tie rods 15 and wheels 17FR, 17FL, 17RR, 17RL form the turning output means. In addition, turning actuator 8, turning actuator angle sensor 9 and turning torque sensor 11 form the turning output control means, and vehicle state parameter acquisition part 21, surroundings recognition part 22 and controller/driver unit 26 form the running state detection means. Furthermore, in-lane running support controller 25 forms the in-lane running support means.

Effects of Embodiment 1

(1) Turning of the steered wheels by the turning output control means and notification operation by the haptic means are executed under conditions different from each other.

Consequently, it is possible to perform control for in-lane running support while realizing coordination between turning of the steered wheels, which influences the behavior of the vehicle, and the operation of driver notification via the haptic means.

As a result, it is possible to perform in-lane running support while avoiding driver discomfort.

For example, in the present embodiment, when the in-lane running support processing is started, control of the turning angle of the steered wheels is started. In this control, the steered wheels are turned such that the vehicle runs along the center of the running lane. As a result, even if a minute lateral displacement takes place, the vehicle can still be recentered in the running lane.

Also, when it is predicted that a large future lateral displacement X from the lane center will take place during execution of the in-lane running support processing, that is, when estimated future lateral displacement Xs is larger than steering reaction force judgment threshold XL1, control of the steering reaction force starts first. In this control, the steering reaction force is increased above that in the normal state. Consequently, it is possible to notify the driver of development of a large future lateral displacement X from the lane center.

As a result, unlike in the method in which the driver is notified each time a lateral displacement takes place, it is possible to prevent driver discomfort. Also, by performing appropriate control of the turning angle and the notification operation, it is possible to perform in-lane running support for the vehicle.

(2) Because the notification operation via the haptic means is performed by an increase in the steering reaction force, it is possible to prevent driver discomfort while the driver can be notified to easily understand the directionality of the in-lane running support operation.

(3) It is possible to perform the in-lane running support control and the operation of notification separately with a simple constitution. Also, because control of the steering reaction force is performed based on the information of lateral displacement, it is possible to reduce driver discomfort.

(4) Because a yaw moment towards the center of the running lane is applied to the vehicle by means of the braking forces of the wheels while the driver is notified, it is possible to perform reliable running support. Also, because running support is provided by the braking force, it is possible to notify the driver more reliably.

(5) After driver notification at first, the yaw moment towards the center of the running lane is applied to the vehicle by the braking forces of the various wheels. Consequently, it is possible to perform the notification operation according to the running state. Also, because running support is performed using the braking forces after notification of the driver, it is possible to reduce driver discomfort.

Embodiments

For the in-lane running support processing, it is possible to switch the control rule according to the vehicle speed.

In this way, because the control rule for performing in-lane running support is switched according to the speed of the vehicle, it is possible to perform control for running support that is appropriate to the running state.

For example, a judgment is made as to whether the vehicle speed exceeds a preset vehicle speed (say, 50 km/h). If YES, it is necessary to perform control to prevent deviation from the lane quickly. Consequently, while the driver is notified by means of the steering reaction force, the braking forces of the wheels are controlled, and a yaw moment towards the center of the running lane is applied to the vehicle. When the vehicle speed has not reached the preset vehicle speed, in order to reduce driver discomfort, the braking forces of the wheels are controlled to apply a yaw moment towards the center of the running lane to the vehicle after the driver is notified by the steering reaction force.

With the control, it is possible to switch between the priority for preventing deviation from the lane and the priority for reducing driver discomfort. Consequently, it is possible to perform control of running support appropriate to the running state.

As another example, the speed region of the vehicle is judged, and depending on whether it falls in the high speed region (such as about 90 km/h) or low speed region (such as about 40 km/h), switching can be performed for control of the steering reaction force and turning of the steered wheels or control of the braking forces of the various wheels.

That is, it is possible to adopt the following scheme: when the vehicle speed is in the preset high speed region, control of the steering reaction force corresponding to the current lateral displacement and control of the steered wheels corresponding to the future lateral displacement are performed, or control of the steering reaction force and control of the braking forces of the wheels are performed corresponding to the current or future lateral displacement. On the other hand, when the vehicle speed is in the preset low speed region, control of the steering reaction force corresponding to the current lateral displacement and control of the steered wheels corresponding to the current lateral displacement are performed, or control of the steering reaction force corresponding to the future lateral displacement and control of the steered wheels corresponding to the future lateral displacement are performed.

By means of this control, depending on whether the vehicle speed is in the preset high speed region or preset low speed region, switching is performed for control of the steering reaction force, steered wheels and braking forces of the wheels corresponding to the current or future lateral displacement. As a result, it is possible to perform appropriate control of running support corresponding to the specific running state.

Embodiment 2

Embodiment 2 will be explained in the following.

Embodiment 2 differs from Embodiment 1 in that when estimated lateral displacement Xs exceeds deviation judgment threshold XL, running support is performed by control of the steering reaction force.

More specifically, Embodiment 2 differs from Embodiment 1 in the method for setting steering reaction force control start judgment flag Fstr and the method for computing steering control torque Tstr in the in-lane running support processing.

That is, in step S104, in-lane running support controller 25 compares deviation judgment threshold XL set for lateral displacement from the center of the running lane and estimated lateral displacement Xs. When $$|Xs| \geq XL \quad (11)$$

in-lane running support controller 25 judges that control of the steering reaction force starts, and sets steering reaction force control start judgment flag Fstr, which indicates whether or not in-lane running support controls steering reaction force, in the state indicating that control of the steering reaction force is ON (Fstr=ON). On the other hand, when $$|Xs| < XL \quad (12)$$

in-lane running support controller 25 judges that control of steering reaction force is not performed, and sets steering reaction force control start judgment flag Fstr in the state indicating that control of the steering reaction force is OFF (Fstr=OFF).

Also, in step S108, a judgment is made first of all as to whether steering reaction force control start judgment flag Fstr set in step S104 is ON. When it is ON, based on estimated future lateral displacement Xs computed in step S103 and deviation judgment threshold XL, the following equation is used to compute steering control torque Tstr for notifying the driver of the lateral displacement of the vehicle.

$$Tstr = Kstr1 \cdot Kstr2 \cdot (|Xs| - XL) \quad (13)$$

With the processing, when estimated lateral displacement Xs of automobile 1 exceeds deviation judgment threshold XL, running support for keeping the vehicle running within the lane while the driver steers is performed by means of steering reaction force control. At the same time, running support for automobile 1 is performed by controlling the braking forces of the wheels and generating a yaw moment to ensure that the vehicle runs in the lane.

Embodiment 3

Embodiment 3 will be explained in the following.

According to Embodiment 3, unlike in Embodiment 1, the time for the vehicle to reach the boundary line that divides the running lanes (boundary line arrival time Tk) is computed, and based on this time turning of the steered wheels and control of the steering reaction force are controlled under conditions that differ from each other.

More specifically, Embodiment 3 differs from Embodiment 1 in the content of the in-lane running support processing.

In-Lane Running Support Processing

Figure 9:
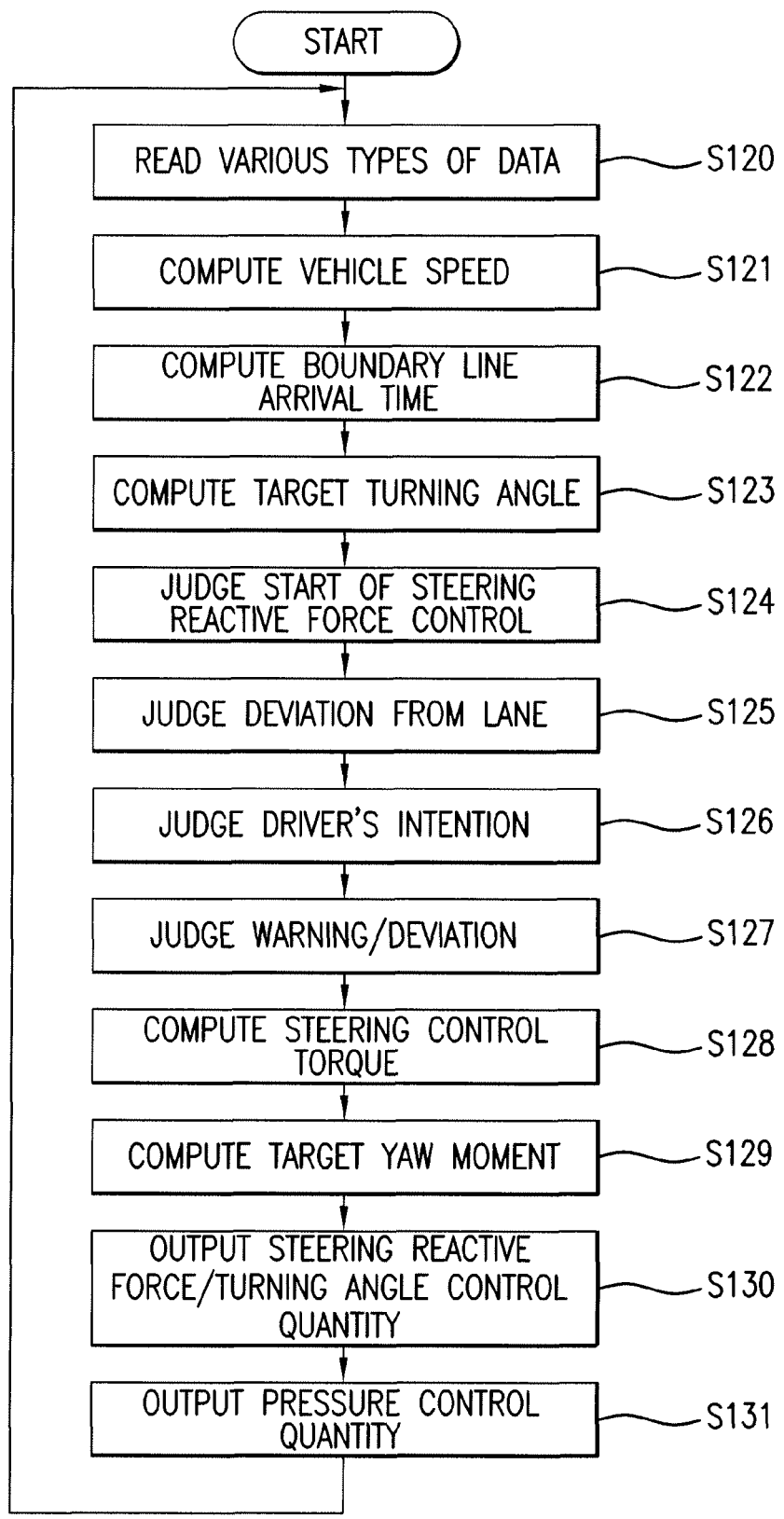
FIG. 9 is a flow chart illustrating the in-lane running support processing executed by in-lane running support controller 25 in Embodiment 3.

FIG. 9 is a flow chart illustrating the in-lane running support processing.

As shown in FIG. 9, in this in-lane running support processing, the signals from the sensors and devices set in the various portions are first of all read in step S200.

More specifically, the pulse signals indicating the rotational speeds of wheels 17FR, 17FL, 17RR, 17RL are read from wheel speed sensors 24FR, 24FL, 24RR, 24RL; the operation signal indicating direction is read from direction indicating switch 23; the in-lane running support information (vehicle yaw angle φr, lateral displacement X from the lane center, and curvature ρ of the running lane) is read from surroundings recognition part 22; and the steering input state (steering angle θs, steering input torque, etc.) and the state of the turning output (actual turning angle θd, turning torque, etc.) are read from controller/driver unit 26. Wheel velocities Vwi (i=1-4) of wheels 17FR, 17FL, 17RR, 17RL are computed based on the read pulse signals.

Process flow then goes to step S201, and based on wheel velocities Vwi of wheels 17FR, 17FL, 17RR, 17RL computed in step S200, vehicle speed V is computed using equation (1) or equation (2).

Process flow then goes to step S202, and the time for the vehicle to reach the boundary line that divides the running lanes (boundary line arrival time) Tk is computed.

More specifically, first of all, based on yaw angle φr, lateral displacement X from the lane center, and curvature ρ of the running lane read in step S200 as well as vehicle speed V computed in step S201, the following equation (14) is used to compute estimated future lateral displacement Xs.

$$Xs = Tt \cdot V \cdot (\phi r + Tt \cdot V \cdot \rho) + X \tag{14}$$

Then, based on computed estimated future lateral displacement Xs and forward viewing distance Xz (=Tt·V), the following equation (15) is used to compute boundary line arrival time Tk.

$$Tk = (Xs^2 + Xz^2)^{1/2}/V \tag{15}$$

Then process flow goes to step S203, and the parameter (target turning angle θopt) for use in turning control for controlling the turning angle to ensure running of the vehicle along the target running path in the lane is computed.

More specifically, based on boundary line arrival time Tk computed in step S202, as well as yaw angle φr, curvature ρ of the running lane, and turning angle θd read in step S200, the following equation (16) is used to compute target turning angle θopt.

$$\theta opt = KL \cdot Tk + KY \cdot \phi r + KR \cdot \rho + KD \cdot \theta t \tag{16}$$

Process flow then goes to step S204, and a judgment is made as to whether the reaction force control for increasing the steering reaction force of input-side steering shaft 3 is performed in order to prevent possible deviation of the vehicle from the lane.

More specifically, a judgment is made first of all as to whether boundary line arrival time Tk computed in step S202 is shorter than steering judgment threshold TL1. If it is the same as or shorter than TL1 (Tk≦TL1), steering reaction force control start judgment flag Fstr that indicates steering control is turned ON, that is, steering control is turned ON (second control mode). On the other hand, when boundary line arrival time Tk is longer than steering judgment threshold TL1 (Tk>TL1), steering reaction force control start judgment flag Fstr is turned OFF, that is, steering control is turned OFF (first control mode).

Then, based on lateral displacement X from the lane center read in step S200, a judgment is made as to whether the vehicle runs deviated to the left/right with respect to the center of the running lane. If the vehicle runs on the right side, displacement direction parameter Dstr indicating the displacement direction is set as right, and if the vehicle runs on the left side, displacement direction parameter Dstr is set as left.

Then process flow goes to step S205, and a judgment is made as to whether the vehicle has a tendency to deviate from the lane.

More specifically, a judgment is made first of all as to whether boundary line arrival time Tk computed in step S202 is shorter than deviation judgment threshold TL (<TL1). If it is shorter than TL (|Tk|≦TL), deviation judgment flag Fout indicating yes/no of the tendency to deviate from the lane is set ON, that is, the state indicates that there is a tendency to deviate from the lane. On the other hand, if boundary line arrival time Tk is longer than deviation judgment threshold TL (|Tk|>TL), deviation judgment flag Fout is turned OFF, that is, the state indicates that there is no tendency to deviate from the lane.

Then, when there is a tendency to deviate from the lane, based on lateral displacement X from the lane center read in step S200, a judgment is made concerning deviation direction parameter Dout indicating a tendency of the vehicle to deviate from the lane in either the left/right direction. When there is a tendency to deviate from the lane to the right side, deviation direction parameter Dout is set as right, and when there is a tendency to deviate from the lane to the left side, deviation direction parameter Dout is set as left.

Process flow then goes to step S206, and a judgment is made as to whether the driver is intentionally performing an operation to increase lateral displacement X from the lane center.

More specifically, first of all, based on the signal of direction indicating switch 23 read in step S200, a judgment is made as to whether direction indicating switch 23 is operated. When direction indicating switch 23 is operated, a judgment is made as to whether direction Q indicated by the signal of direction indicating switch 23 and the direction indicated by displacement direction parameter Dstr judged in step S204 are the same. If they are the same, it is judged that the driver intentionally performs an operation to increase lateral displacement X from the lane center, so that steering reaction force control start judgment flag Fstr set in step S204 is changed to the OFF state. On the other hand, when direction Q and the direction indicated by displacement direction parameter Dstr are different from each other, it is judged that the driver is not intentionally performing operation, so that the steering reaction force control start judgment flag is not changed.

When direction indicating switch 23 is not operated, based on steering angle θs read in step S200, a judgment is made as to whether the driver performs steering in the direction corresponding to an increased tendency to deviate from the lane. If steering is done in a direction that increases the tendency to deviate from the lane, if steering angle θs and variation per unit time Δθs of the steering angle exceed the preset levels it is judged that the driver intentionally performs an operation to increase lateral displacement X from the lane center, and steering reaction force control start judgment flag Fstr set in step S204 is changed to the OFF state.

Then, a judgment is made as to whether direction indicating switch 23 is operated based on the signal of direction indicating switch 23 read in step S200. If direction indicating switch 23 is operated, a judgment is made as to whether direction Q indicated by the signal of direction indicating switch 23 and the direction indicated by deviation direction parameter Dout judged in step S205 are the same. If YES, it is judged that the driver intentionally performs the operation to increase lateral displacement X from the lane center, so that deviation judgment flag Fout set in step S205 is changed to the OFF state. On the other hand, when direction Q and the direction indicated by deviation direction parameter Dout are different from each other, it is judged that the driver does not intentionally perform the operation, and the deviation judgment flag is not changed.

When direction indicating switch 23 is not operated, based on steering angle θs read in step S200, a judgment is made as to whether the driver steers in the direction to increase the tendency to deviate from the lane. If the driver steers in the direction to increase the tendency to deviate from the lane, when steering angle θs and variation per unit time Δθs of the steering angle exceed the preset levels, it is judged that the driver intentionally performs the operation in the direction to increase lateral displacement X from the lane center, and deviation judgment flag Fout is changed to the OFF state.

Here, as a method for judging whether the driver intentionally performs an operation to increase lateral displacement X from the lane center, steering torque Ts obtained from steering torque sensor 5 can be used to perform the judgment for example, instead of steering angle θs and variation per unit time Δθs of the steering angle.

Process flow then goes to step S207, and a judgment is made as to whether a warning should be issued to notify the driver about the tendency of the vehicle to deviate from the lane.

More specifically, a judgment is made as to whether deviation judgment flag Fout set in step S205 is ON. If it is ON, that is, when boundary line arrival time Tk≦TL and deviation from the lane is not the intention of the driver, a warning beep is output from a speaker (not shown in the figure) set in the vehicle to notify the driver of the tendency to deviate from the lane.

Also, with respect to the timing of the warning, in addition to the scheme in which a warning is issued at the same time that turning control is performed, a scheme can also be adopted in which a warning is issued at a timing different from that of turning control.

In addition to a warning beep, control of the braking forces can also be performed. In this way, due to braking, g-force acts on the driver, and this augments the warning effect.

Process flow then goes to step S208, and the parameter (steering control torque Tstr) for use in the reaction force control is computed.

More specifically, first of all, a judgment is made as to whether steering reaction force control start judgment flag Fstr set in step S204 or S206 is ON. If it is ON, based on boundary line arrival time Tk computed in step S202, the following equation (17) is used to compute steering control torque Tstr.

$$Tstr = Kstr1 \cdot Kstr2/Tk \qquad (17)$$

When steering reaction force control start judgment flag Fstr is OFF, steering control torque Tstr is set at "0".

Then a judgment is made as to whether steering control torque Tstr computed above is larger than preset maximum value Tmax or smaller than minimum value Tmin. If it is larger than maximum value Tmax, the value of steering torque Tstr is corrected to Tmax, and if it is smaller than minimum value Tmin, the value of steering control torque Tstr is corrected to minimum value Tmin.

Process flow then goes to step S209, and the parameter (target yaw moment Ms) is computed for use in control of the braking forces for preventing the vehicle from deviating from the lane.

More specifically, first of all a judgment is made as to whether deviation judgment flag Fout set in step S205 or S206 is ON. If it is ON, based on boundary line arrival time Tk computed in step S202, the following equation (18) is used to compute target yaw moment Ms.

$$Ms = K1 \cdot K2/Tk \qquad (18)$$

When deviation judgment flag Fout is OFF, target yaw moment Ms is set at "0".

Then a judgment is made as to whether computed target yaw moment Ms is larger than preset maximum value Mmax or smaller than minimum value Mmin. If it is larger than maximum value Mmax, the value of target yaw moment Ms is corrected to Mmax, and if it is smaller than minimum value Mmin, the value of target yaw moment Ms is corrected to Mmin.

Process flow then goes to step S210, and the parameter pertaining to control of front wheels 17FR, 17FL and control of the steering reaction force applied to input-side steering shaft 3 is computed.

More specifically, a judgment is made as to whether steering reaction force control start judgment flag Fstr set in step S204 or S206 is ON. If it is ON, the parameter is computed for controlling turning actuator 8 to make the turning angle match target turning angle θopt computed in step S203, and at the same time, the parameter is computed for controlling steering reaction force actuator 6 so that the steering reaction force is increased by only steering control torque Tstr computed in step S208.

When steering reaction force control start judgment flag Fstr is OFF, the parameter for controlling turning actuator 8 to make the turning angle match target turning angle θopt and the parameter for controlling steering reaction force actuator 6 so that steering control torque Tstr is set at "0" are computed.

Process flow then goes to step S211, and the parameter pertaining to control of the braking forces of wheels 17FR, 17FL, 17RR, 17RL is computed.

More specifically, a judgment is made as to whether deviation judgment flag Fout set in step S205 is in the ON state. If it is ON, the parameter is computed for venting a pressure difference in wheel cylinders 19 of the left/right wheels to have the yaw moment match target yaw moment Ms computed in step S109, and process flow goes to step S200. When deviation judgment flag Fout is OFF, the target yaw moment is set at value "0", and no pressure difference is applied to wheel cylinders 19 for the left/right wheels.

Operation

The operation in the present embodiment will be explained in the following under specific circumstances.

First of all, it is assumed that the vehicle is running near the center of the running lane on a straight road. As shown in FIG. 9, by means of the running support control executed by in-lane running support controller 25, first of all, the signals input from the sensors and devices set in the various portions are read in step S200, and in step S201 vehicle speed V is computed based on wheel velocities Vwi of wheels 17FR, 17FL, 17RR, 17RL that have been read. Also, in step S202, boundary line arrival time Tk is computed as a relatively large value based on computed vehicle speed V, and in step S203, target turning angle θopt is computed based on computed boundary line arrival time Tk.

Here, it is assumed that boundary line arrival time Tk is longer than steering judgment threshold TL1 and deviation judgment threshold TL. As a result, in step S204, steering reaction force control start judgment flag Fstr is set in the OFF state, that is, it is set in a state with steering control OFF. In step S205, deviation judgment flag Fout is set in the OFF state, that is, in the state with no tendency to deviate from the lane. Because direction indicating switch 23 is not operated, in step S206 it is judged that the driver is not intentionally performing an operation to increase lateral displacement X from the lane center, and deviation judgment flag Fout is in the OFF state. Consequently, in step S207 it is judged that no warning is issued. Also, because steering reaction force control start judgment flag Fstr is OFF, in step S208 steering control torque Tstr is set at "0", and, in step S209, because deviation judgment flag Fout is OFF, target yaw moment Ms is set at "0".

Also, because steering reaction force control start judgment flag Fstr is OFF, in step S210 the parameter for controlling turning actuator 8 to make the turning angle match the target turning angle θopt and the parameter for controlling steering reaction force actuator 6 such that the steering reaction force is increased by steering control torque Tstr "0" are computed, and are output to controller/driver unit 26. Also, because deviation judgment flag Fout is OFF, in step S211 the parameter that does not create a pressure difference in wheel cylinders 19 of the left/right wheels is computed, and after the computed parameter is output as an instruction signal to pressure control unit 20, the process flow is executed repeatedly starting from step S200.

Here, an instruction to rotate output-side steering shaft 10 is output by means of controller/driver unit 26, output-side steering shaft 10 is rotated by means of turning actuator 8, and the turning angle of front wheels 17FR, 17FL becomes the value of target turning angle θopt.

Also, controller/driver unit 26 instructs for the application of torque "0", and steering reaction force actuator 6 apply only the steering reaction force corresponding to the normal reaction force to input-side steering shaft 3.

As a result, even when the vehicle deviates from the center of the running lane, the vehicle can recover to the center of the running lane by controlling the turning angle of front wheels 17FR, 17FL and by applying only the steering reaction force corresponding to the turning angle.

Now, assume that the vehicle deviates from near the center of the running lane as the driver unintentionally performs an action to increase lateral displacement X from the lane center while the process flow is repeated. As a result, the running support control operation is performed through step S200 and step S201, and in step S202, boundary line arrival time Tk is computed at a relatively small value, and in step S203, target turning angle θopt is computed.

Here, assume that boundary line arrival time Tk is smaller than steering judgment threshold TL1 and larger than deviation judgment threshold TL. As a result, steering reaction force control start judgment flag Fstr is set ON in step S204, that is, set in the state indicating steering control is ON. In step S205, deviation judgment flag Fout is set in the OFF state. Also, after going through steps S206, S207, in step S208, because steering reaction force control start judgment flag Fstr is ON, steering control torque Tstr is computed based on boundary line arrival time Tk. Also, in step S209, because deviation judgment flag Fout is OFF, target yaw moment Ms is set at "0".

Also, because steering reaction force control start judgment flag Fstr is ON, in step S210 the parameter for controlling turning actuator 8 to make the turning angle match target turning angle θopt, and the parameter for controlling steering reaction force actuator 6 such that the steering reaction force are increased by steering control torque Tstr and output to controller/driver unit 26. Also, because deviation judgment flag Fout is OFF, in the step S211 the parameter is computed that creates no pressure difference in wheel cylinders 19 of the left/right wheels, and after the computed parameter is output as an instruction signal to pressure control unit 20, the process flow is executed repeatedly from the step S200.

Then an instruction to make output-side steering shaft 10 rotate is output by means of controller/driver unit 26, and output-side steering shaft 10 is rotated by means of turning actuator 8 so that the turning angle of front wheels 17FR, 17FL becomes target turning angle θopt.

Also, controller/driver unit 26 not only outputs the instruction for generating the steering reaction force corresponding to the difference between target turning angle θopt of turning actuator 8 and actual turning angle θd, but it also outputs the instruction for increasing the steering reaction force, and a steering reaction force larger than the steering reaction force corresponding to the difference by as much as steering control torque Tstr is output by means of steering reaction force actuator 6.

As a result, in addition to control of the turning angle of front wheels 17FR, 17FL, the torque of input-side steering shaft 3 is increased to increase the steering reaction force, so that the driver is notified of the possibility of vehicle deviation from the lane, and is prompted to perform a steering operation. As a result, compared with the case when only control of the turning angle of front wheels 17FR, 17FL is performed, the vehicle can recover to the center of the running lane more quickly.

Effects of Embodiment 3

(1) As explained above, according to the in-lane running support device in this embodiment, the time until the vehicle reaches the boundary line that divides the running lanes (boundary line arrival time Tk) is computed based on the information about the running state of the vehicle, and turning of the steered wheels and the operation of driver notification via the steering input means (turning control, reaction force control) are controlled based on this computed boundary line arrival time under conditions different from each other to perform in-lane running support. As a result, the notification operation via the steering input means is not performed in the normal state, and only turning of the steered wheels is performed to make the vehicle run along the target running path in the lane (center of the lane). Only when there is no margin in the time until deviation from the lane will notification be performed in addition to the turning to provide the driver with the support information for running within the lane, so that it is possible to make the steering operation and the support information match, and it is possible to support the in-lane running while preventing driver discomfort.

Here, in addition to the method of increasing the steering reaction force for performing driver notification via the steering input means, a scheme can also be adopted in which vibration is applied to steering wheel 2.

(2) In addition, the steering reaction force is increased as the notification operation. That is, notification is performed using a scheme whereby the driver can easily become aware, so that it is possible to improve the notification effect.

(3) In addition, when the time for the vehicle to reach the boundary line that divides the running lanes (boundary line arrival time Tk) is longer than the preset value (steering judgment threshold TL1), only control of the steering angle of the steered wheels (front wheels 17FR, 17FL) is performed, while the increased steering reaction force notification operation is not performed. Consequently, when the vehicle runs near the target running path, the increased steering reaction force notification operation is not performed, so that the notification does not fight driver's intention, and driver influence on the steering operation can be eliminated, and driver unease can be appropriately prevented. Also, by turning the steered wheels so that the vehicle runs along the target running path, it is possible to improve the feeling of straightness by the driver.

(4) According to the present embodiment, when the time until the vehicle reaches the boundary line that divides the running lanes is longer than the preset value, only turning control is performed. However, a scheme can also be adopted in which control of the reaction force is started after starting the turning control when the boundary line arrival time is longer than the preset value. As a result, the steering reaction force is controlled after the behavior of the vehicle is changed and the turning angle of the steering wheels is controlled, so that the tendency of the vehicle to deviate can be efficiently transmitted to the driver, and in-lane running can be supported more appropriately.

For example, as a method for starting the control of reaction force after starting turning control in the in-lane running support processing, a judgment can be made as to whether boundary line arrival time Tk computed in step S202 is shorter than turning judgment threshold TL2 (>TL1). If it is shorter than TL2 (Tk≦TL2), turning control is performed. If it is longer than TL2 (Tk>TL2), turning control is not performed.

What is claimed is:

1. An in-lane running support system for a vehicle, comprising:
    a steering input device configured to input steering operations by a driver;
    a steering input detector configured to detect the steering operations inputted via said steering input device;
    a reaction force device configured to change a condition of the steering input device between a normal operation mode that provides a normal reaction force to the driver via said steering input device, and a haptic operation mode that performs a notification operation to the driver via said steering input device;
    a turning output device, which is mechanically disconnectable from said steering input device, configured to turn steerable wheels;
    a turning output controller configured to control turning of the steerable wheels by said turning output device corresponding to the steering operations detected by said steering input detector;
    a running state detecting device configured to acquire information indicative of a lateral displacement of the vehicle with respect to a center of a vehicle running lane; and
    an in-lane running support device configured to control said turning output device and said reaction force device based on the information indicative of the lateral displacement such that the vehicle runs in the vehicle running lane,
    wherein said in-lane running support device has a first control mode that controls the turning output device and causes the reaction force device to operate in the normal operation mode, and has a second control mode that controls the turning output device and causes the reaction force device to operate in the haptic operation mode,
    wherein the in-lane running support device is configured to change a control mode between the first control mode and the second control mode on a basis of the lateral displacement of the vehicle by determining whether an amount of the lateral displacement is greater than a non-zero threshold, with the second control mode being selected when the amount of the lateral displacement exceeds the non-zero threshold,
    wherein the in-lane running support device is configured to increase the reaction force as the lateral displacement increases when the in-lane running support device is in the second control mode.

2. The in-lane running support system according to claim 1, wherein said reaction force device is configured to increase the reaction force of said steering input device in addition to the normal reaction force as said notification operation.

3. The in-lane running support system according to claim 1, further comprising:
    a braking force controller configured to control the braking force of each wheel individually,
    wherein said in-lane running support device is configured to control said reaction force device to perform the notification operation and control said braking force controller to apply a yaw moment towards the center of the vehicle running lane to the vehicle.

4. The in-lane running support system according to claim 1, further comprising:
    a braking force controller configured to control the braking force of each wheel individually,
    wherein said in-lane running support device is configured to control said braking force controller to apply a yaw moment towards the center of the vehicle running lane to the vehicle after performing the notification operation with said reaction force device.

5. The in-lane running support system according to claim 2, wherein:
    said running state detecting device is configured to acquire information indicative of a time until the vehicle arrives at a boundary line that divides the vehicle running lane, and said in-lane running support device is configured to control said reaction force device to perform the notification operation based on the information indicative of the time acquired by said running state detecting device.

6. The in-lane running support system according to claim 1, wherein:
    said running state detecting device is configured to acquire information indicative of a time until the vehicle arrives at a boundary line that divides the vehicle running lane; and said in-lane running support device is configured to control said turning output device and said reaction force device by the first control mode when the time is longer than a predetermined time, and control said turning output device and said reaction force device by the second control mode when the time is the same as or shorter than the predetermined time.

7. The in-lane running support system according to claim 1, wherein the lateral displacement is an estimated lateral displacement.

8. A vehicle, comprising:
    a vehicle body,
    plural wheels mounted on the vehicle body,
    a steering input device configured to input steering operations by a driver;
    a steering input detector configured to detect the steering operations inputted via said steering input device;
    a reaction force device configured to change a condition of the steering input device between a normal operation mode that provides a normal reaction force to the driver via said steering input device, and a haptic operation mode that performs a notification operation to the driver via said steering input device;
a turning output device, which is mechanically disconnectable from said steering input device, configured to turn steerable wheels;
a turning output controller configured to control turning of the steerable wheels by said turning output device corresponding to the steering operations detected by said steering input detector;
a running state detecting device configured to acquire information indicative of a lateral displacement of the vehicle with respect to a center of a vehicle running lane; and
an in-lane running support device configured to control said turning output device and said reaction force device based on the information indicative of the lateral displacement such that the vehicle runs in the vehicle running lane,
wherein said in-lane running support device has a first control mode that controls the turning output device and causes the reaction force device to operate in the normal operation mode, and has a second control mode that controls the turning output device and causes the reaction force device to operate in the haptic operation mode,
wherein the in-lane running support device is configured to change a control mode between the first control mode and the second control mode on a basis of the lateral displacement of the vehicle by determining whether an amount of the lateral displacement is greater than a non-zero threshold, with the second control mode being selected when the amount of the lateral displacement exceeds the non-zero threshold,
wherein the in-lane running support device is configured to increase the reaction force as the lateral displacement increases when the in-lane running support device is in the second control mode.

9. An in-lane running support system for a vehicle, comprising:
a steering input means for inputting steering operations by a driver;
a steering input detection means for detecting the steering operations inputted via said steering input means;
a reaction force means for changing a condition of the steering input means between a normal operation mode that provides a normal reaction force to the driver via said steering input means, and a haptic operation mode that performs a notification operation to the driver via said steering input means;
a turning output means, which is mechanically disconnectable from said steering input means, for turning steerable wheels;
a turning output control means for controlling turning of the steerable wheels by said turning output means corresponding to the steering operations detected by said steering input detection means;
a running state detection means for acquiring information indicative of a lateral displacement of the vehicle with respect to a center of a vehicle running lane; and
an in-lane running support means for controlling said turning output means and said reaction force means based on the information indicative of the lateral displacement such that the vehicle runs in the vehicle running lane,
wherein said in-lane running support means has a first control mode that controls the turning output means and causes the reaction force means to operate in the normal operation mode, and has a second control mode that controls the turning output means and causes the reaction force means to operate in the haptic operation mode,
wherein the in-lane running support means is configured to change a control mode between the first control mode and the second control mode on a basis of the lateral displacement of the vehicle by determining whether an amount of the lateral displacement is greater than a non-zero threshold, with the second control mode being selected when the amount of the lateral displacement exceeds the non-zero threshold, and
wherein the in-lane running support means is configured to increase the reaction force as the lateral displacement increases when the in-lane running support means is in the second control mode.

10. An in-lane running support method for a vehicle, comprising:
detecting information indicative of a lateral displacement of the vehicle with respect to a center of a vehicle running lane; and
controlling a turning control of steerable wheels such that the vehicle runs in the vehicle running lane and reaction force of a steering input device based on the information indicative of the lateral displacement,
wherein said controlling step includes selectively controlling the turning control using a first control mode that controls the steerable wheels and provides a normal reaction force to the driver via the steering input device, and a second control mode that controls the steerable wheels and performs a notification operation via the steering input device,
wherein the controlling step includes selecting a control mode from the first control mode and the second control mode on a basis of the lateral displacement of the vehicle by determining whether an amount of the lateral displacement is greater than a non-zero threshold, with the second control mode being selected when the amount of lateral displacement exceeds the non-zero threshold, and
wherein the controlling step includes increasing the reaction force as the lateral displacement increases when the turning control is controlled using the second control mode.

11. A computer readable storage medium, having stored information for in-lane running support control for a vehicle, comprising:
instructions for detecting information indicative of a lateral displacement of the vehicle with respect to a center of a vehicle running lane; and
instructions for controlling a turning control of steerable wheels such that the vehicle runs in the vehicle running lane and reaction force of a steering input device based on the information indicative of the lateral displacement,
wherein said controlling instructions include instructions for a first control mode that controls the steerable wheels and provides a normal reaction force to the driver via the steering input device, and instructions for a second control mode that controls the steerable wheels and performs a notification operation via the steering input device,
wherein the controlling instructions include instructions to change a control mode between the first control mode and the second control mode on a basis of the lateral displacement of the vehicle by determining whether an amount of the lateral displacement is greater than a non-zero threshold, with the second control mode being selected when the amount of the lateral displacement exceeds the non-zero threshold, and wherein the instructions for the second control mode include instructions to increase the reaction force as the lateral displacement increases.

\* \* \* \* \*